March 3, 1931. A. SYHRE 1,795,185
APPARATUS FOR COPYING ON LIGHT SENSITIVE SURFACES
Filed May 24, 1929 6 Sheets-Sheet 1

Inventor:
Alfred Syhre
by Paul ......
attorney.

March 3, 1931. A. SYHRE 1,795,185
APPARATUS FOR COPYING ON LIGHT SENSITIVE SURFACES
Filed May 24, 1929 6 Sheets-Sheet 3

Inventor:
Alfred Syhre

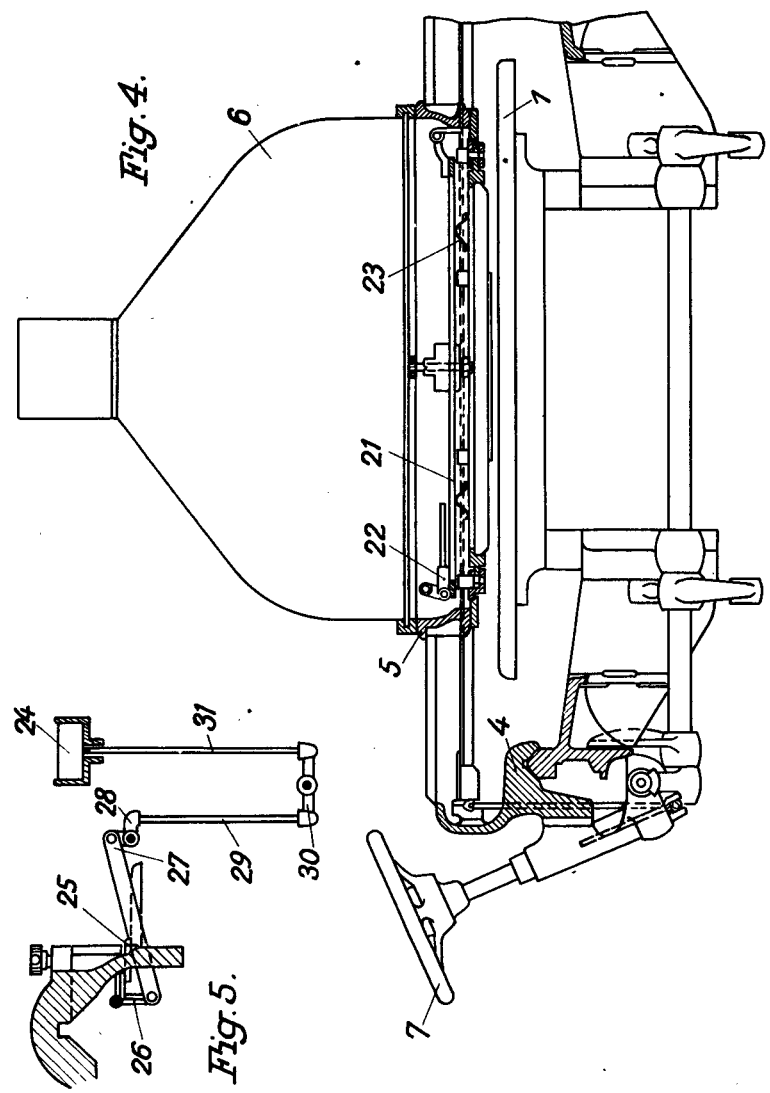

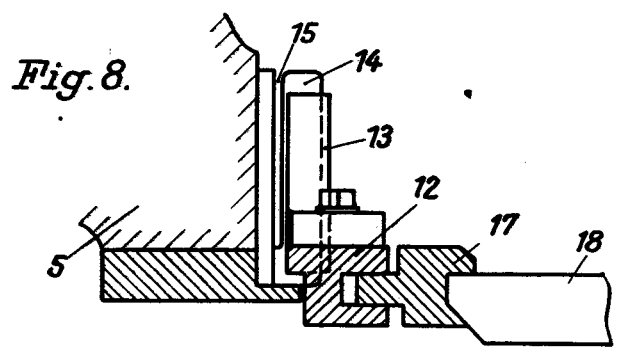
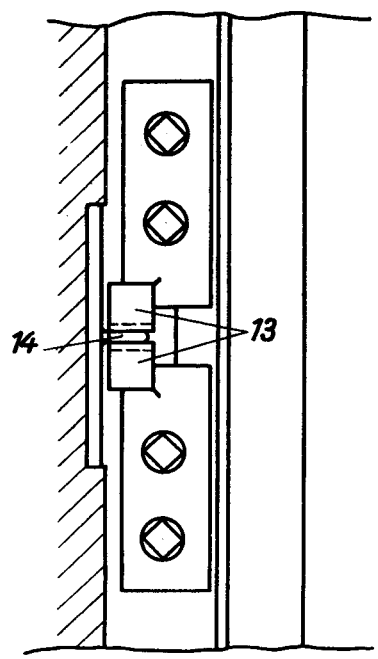
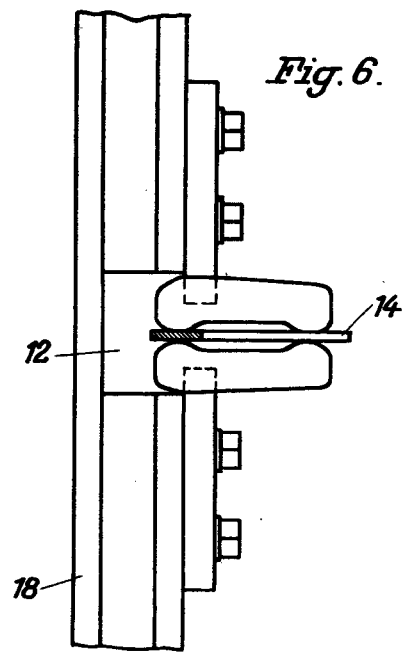

March 3, 1931.   A. SYHRE   1,795,185
APPARATUS FOR COPYING ON LIGHT SENSITIVE SURFACES
Filed May 24, 1929   6 Sheets-Sheet 6

Inventor:
Alfred Syhre

Patented Mar. 3, 1931

1,795,185

UNITED STATES PATENT OFFICE

ALFRED SYHRE, OF LEIPZIG, GERMANY, ASSIGNOR TO KRAUSEWERK AKTIENGESELL-SCHAFT, OF LEIPZIG, GERMANY, A COMPANY OF GERMANY

APPARATUS FOR COPYING ON LIGHT-SENSITIVE SURFACES

Application filed May 24, 1929, Serial No. 365,605, and in Germany October 11, 1927.

The invention relates to apparatus for copying on light-sensitive surfaces, generally from a negative on to a stone or metal printing plate, the apparatus being of the kind in which the holder of the negative is carried by a frame laterally movable in one direction on or in a frame which is laterally movable in the direction perpendicular to the movement of the first mentioned frame.

According to our invention the holder of the negative is movable perpendicularly to the plane of movement of the frame which carries it.

An example of apparatus according to the invention is illustrated in the annexed drawings.

Figure 1:
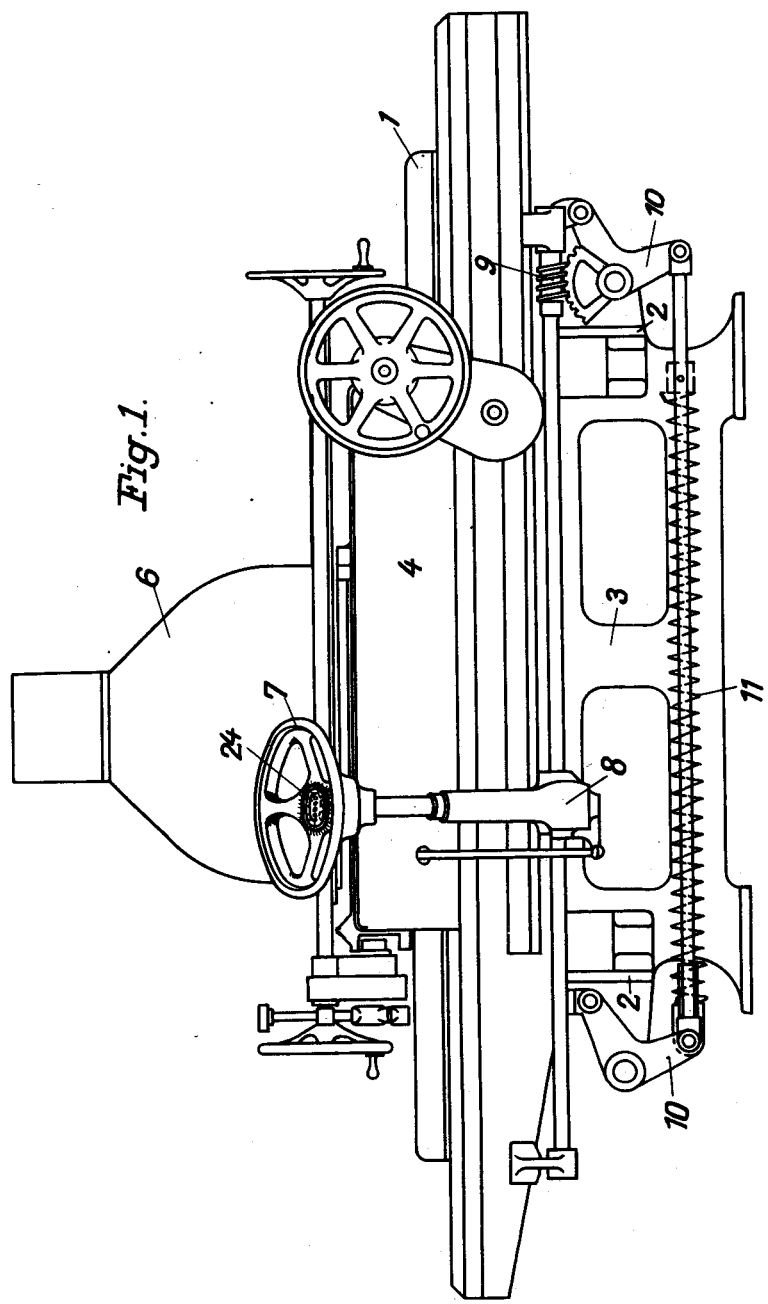
Figure 2:
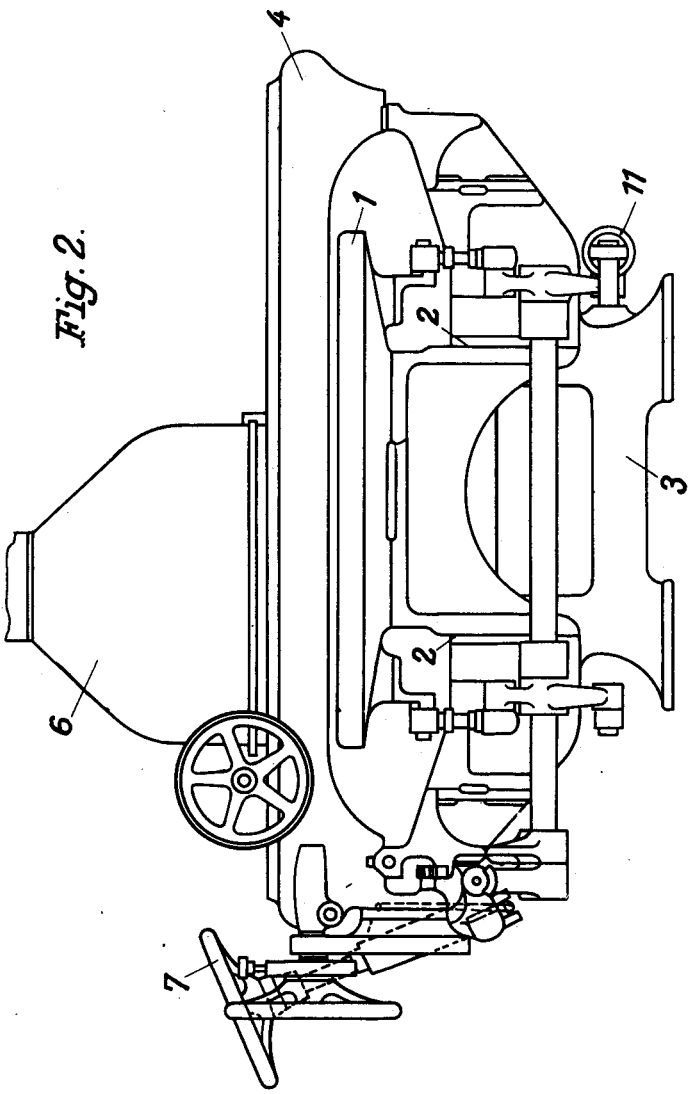
Figure 3:
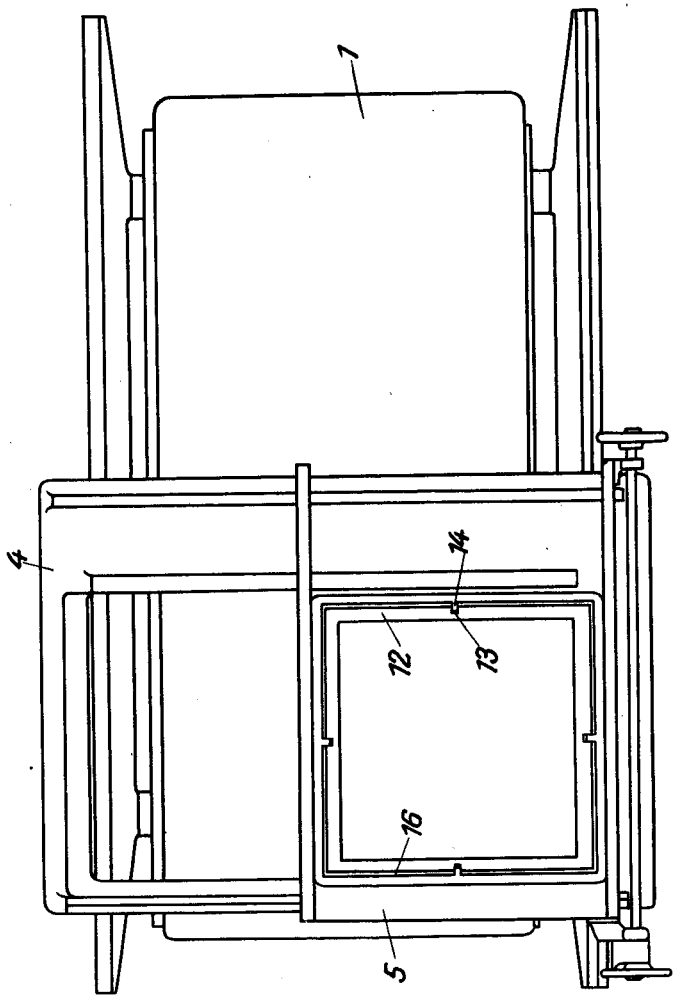
Figure 10:
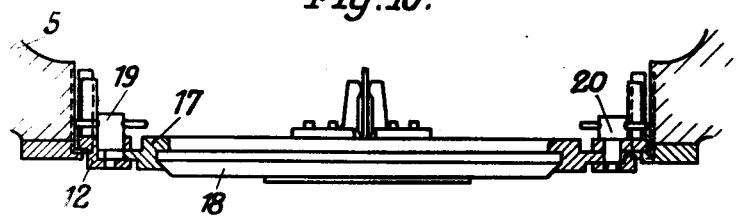
Figure 9:
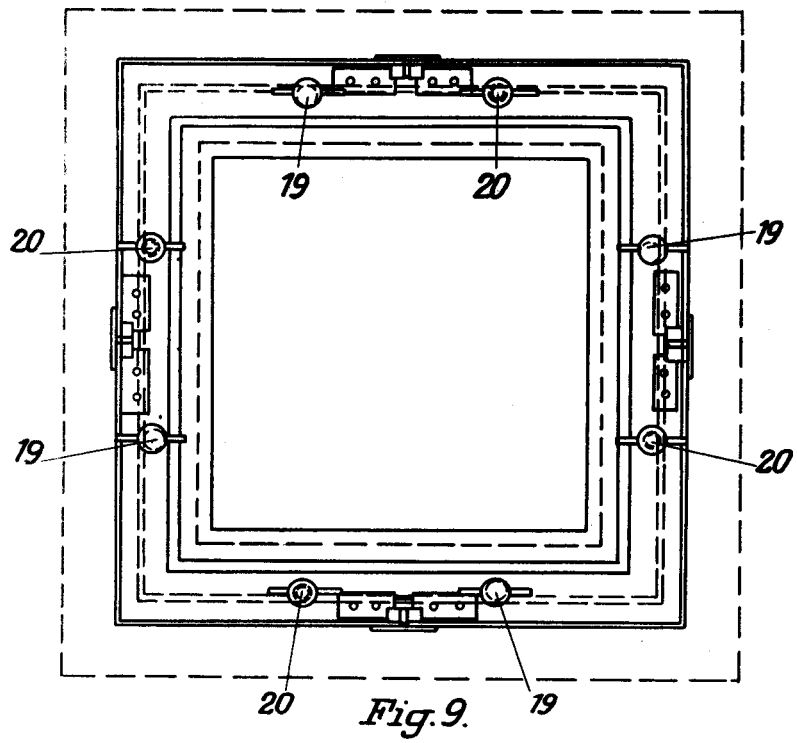

Fig. 1 is a front view thereof, and
Fig. 2 is a side view,
Fig. 3 being a plan view, with the lamp holder removed, and
Fig. 4 is a vertical section.
Fig. 5 is a view of the meter and its actuating mechanism.
Fig. 6 is a side elevation of parts shown in Fig. 8.
Fig. 7 is a top plan view of parts shown in Fig. 8.
Fig. 8 is a cross-section through one side of the holder carrying frame and the holder.
Fig. 9 is a top plan view of the holder and means for mounting it on the holder carrying frame.
Fig. 10 is a cross-section through the parts shown in Fig. 9.

In the drawings 1 represents a table for the printing plate to be exposed, the table being vertically movable between guides 2 on a bed 3. Around the table there is a frame 4, and above it a frame 5, these frames being movable perpendicularly to each other. Above the frame 5 which supports the negative, is a lamp holder 6, which can be moved aside.

Owing to the table 1 being vertically movable, instead of the lamp holder, the guides 2 enabling the vertical adjustment to be made are well removed from the lamp, and consequently are not liable to become overheated. Moreover, being spaced well apart, the guides afford very accurate guidance. Another advantage of making the table vertically movable, instead of the lamp, is that metal printing plates and stone can be dealt with alternatively.

The table 1 is raised and lowered by means of a hand wheel 7 actuating worm gears 8 and 9 and bell crank levers 10. Springs 11 take part of the load on the bell crank levers, the stress on the springs being less, when the table is raised for metal plates, than when the table is lowered for the heavier stones.

Within the frame 5 there is a holder 12 for the negative, the holder having slotted brackets 13 which engage vertical flanges 14 on the frame. The flanges 14 have slots 15 extending downwards from the top, so that the upper parts thereof are resilient. The holder engaged with the flanges is not movable laterally, but can be raised and lowered, and can also, by virtue of the resilience of the flanges, be slightly tilted, should that be necessary, by reason of some inequality of thickness, to enable the negative to lie evenly on the printing plate. There is a gap 16 between the frame 5 and the holder 12.

Within the holder 12 is a frame 17, in which the glass plate 18 is fixed. The frame 17 can be adjusted horizontally in the holder 12 in all directions, by means of cams 19, and fixed by means of binding screw 20. Instead of cams we may use set screws or any other convenient means for adjusting the frame 17. The horizontal adjustability of the frame 17 in the holder 12 (the latter being horizontally immovable in the frame 5, enables the picture to be very accurately centred. The holder 12, with the negative, is inserted into the frame 5 from above, the lamp holder 6 being moved aside for this purpose. The fact that the lamp holder can be moved aside enables the negative to be inspected at any time without removing it from the frame.

After insertion of the holder 12 a hinged frame 21 is folded down over it, and fastened by means of a bayonet catch 22, this frame 21 having springs 23 which bear upon the holder 12, or against which the holder 12 is pressed when the table 1, with the plate upon it, is raised into contact with the negative. A meter 24 at the hub of the hand wheel 7 indicates when the lifting of the table has begun to exert pressure on the holder 12 and contact between the negative and the plate has been obtained. It also indicates the strength of the pressure. The meter within the hand wheel is very easy to observe while manipulating the table. The meter 24 is actuated by means of a stud 25 (Fig. 5) which is mounted in the frame 5 and is vertically movable. After insertion of the holder 12 into the frame 5 this stud is rotated so that an eccentric portion thereof engages over the holder. On the holder being raised by the lifting of the table the stud is also raised, together with a bracket 26 connected by a link 27 to a small bell crank lever 28, which it rocks, thus actuating by means of a rod 29 a double armed lever 30 connected by a rod 31 to the meter 24.

What I claim is:

1. In an apparatus for printing from a negative upon a printing plate, the combination of a stationary main frame, a table carried thereby for supporting the printing plate, a pair of adjustable frames arranged in superposed relation above the table and adjustable horizontally in planes perpendicularly to each other, a lamp holder movable into and out of registry with the upper adjustable frame, a negative holder mounted for vertical and unilateral tilting adjustment on the upper adjustable frame, and a negative carrying frame mounted in said holder.

2. In an apparatus for printing from a negative upon a printing plate, the combination of a stationary main frame, a table carried thereby for supporting the printing plate, means for vertically adjusting said table, a pair of adjustable frames arranged in superposed relation above the table and adjustable horizontally in planes perpendicularly to each other, a lamp holder movable into and out of registry with the upper adjustable frame, a negative holder mounted for vertical and unilateral tilting adjustments on the upper adjustable frame, and a negative carrying frame mounted in said holder.

3. In an apparatus for printing from a negative upon a printing plate, the combination of a stationary main frame, a table carried thereby for supporting the printing plate, means for vertically adjusting said table, means cooperating with the adjusting means for balancing the weight of the table, a pair of adjustable frames arranged in superposed relation above the table and adjustable horizontally in planes perpendicularly to each other, a lamp holder movable into and out of registry with the upper adjustable frame, a negative holder mounted for vertical and unilateral tilting adjustments on the upper adjustable frame, and a negative carrying frame mounted in said holder.

4. In an apparatus for printing from a negative upon a printing plate, the combination of a stationary main frame, a table carried thereby for supporting the printing plate, gearing including bell crank levers and a connecting rod coupling the same for vertically adjusting the table, a spring acting on said rod for balancing the weight of the table, a pair of adjustable frames arranged in superposed relation above the table and adjustable horizontally in planes perpendicularly to each other, a lamp holder movable into and out of registry with the upper adjustable frame, a negative holder mounted for vertical and unilateral tilting adjustments on the upper adjustable frame, and a negative carrying frame mounted in said holder.

5. In an apparatus for printing from a negative upon a printing plate, the combination of a stationary main frame, a table carried thereby for supporting the printing plate, a pair of adjustable frames arranged in superposed relation above the table and adjustble horizontally in planes perpendicularly to each other, a lamp holder movable into and out of registry with the upper adjustable frame, resilient posts on the upper adjustable frame, a negative holder mounted for vertical and unilateral tilting adjustments on said posts, and a negative carrying frame mounted in said holder.

6. In an apparatus for printing from a negative upon a printing plate, the combination of a stationary main frame, a table carried thereby for supporting the printing plate, a pair of adjustable frames arranged in superposed relation above the table and adjustable horizontally in planes perpendicularly to each other, a lamp holder movable into and out of registry with the upper adjustable frame, a negative holder carried by the upper adjustable frame, a negative carrying frame mounted in said holder, pressure means for exerting downward pressure on the holder and permitting yielding upward movement thereof, means for vertically adjusting the table and causing the printing plate carried thereby to exert upward pressure on the negative holder in opposition to the first-named pressure, and indicating means automaticaly operative for indicating the pressure exerted on the holder at any time.

7. In an apparatus for printing from a negative upon a printing plate, the combination of a stationary main frame, a table carried thereby for supporting the printing plate, a pair of adjustable frames arranged in superposed relation above the table and adjustable horizontally in planes perpendicularly to each other, a lamp holder movable into and out of registry with the upper adjustable frame, a negative holder mounted for vertical and unilateral tilting adjustments on the upper adjustable frame, a negative carrying frame adjustable horizontally in all four cardinal directions on the negative holder, and means for adjusting said negative carrying frame.

8. In an apparatus for printing from a negative upon a printing plate, the combination of a stationary main frame, a table carried thereby for supporting the printing plate, a pair of adjustable frames arranged in superposed relation above the table and adjustable horizontally in planes perpendicularly to each other, a lamp holder movable into and out of registry with the upper adjustable frame, a negative holder mounted for vertical and unilateral tilting adjustments on the upper adjustable frame, a negative carrying frame slidably mounted for universal horizontal adjustment in said negative holder, and cam means for adjusting said negative carrying frame.

In testimony whereof I affix my signature.

ALFRED SYHRE.